(12) United States Patent
Hyde et al.

(10) Patent No.: US 10,385,800 B2
(45) Date of Patent: Aug. 20, 2019

(54) CYLINDER HEAD ASSEMBLY, CYLINDER HEAD, AND METHOD

(71) Applicant: Caterpillar Inc., Peoria, IL (US)

(72) Inventors: Joshua Hyde, West Lafayette, IN (US); Lucas Burger, Lafayette, IN (US); Jonathan Chittenden, West Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 77 days.

(21) Appl. No.: 15/612,613

(22) Filed: Jun. 2, 2017

(65) Prior Publication Data
US 2018/0347507 A1    Dec. 6, 2018

(51) Int. Cl.
| F02F 1/36 | (2006.01) |
| F02F 1/40 | (2006.01) |
| F02F 1/24 | (2006.01) |
| F02P 13/00 | (2006.01) |

(52) U.S. Cl.
CPC ............... *F02F 1/40* (2013.01); *F02F 1/242* (2013.01); *F02P 13/00* (2013.01); *F02F 2200/00* (2013.01)

(58) Field of Classification Search
CPC ...... F02F 1/40; F02F 1/242; F02F 1/36; F02F 1/38; F02F 1/24; F02F 2200/00; F01P 3/02; F01P 2003/024; F01P 3/16; F01P 2003/027; F01P 1/06; F01P 2001/026; F01P 2003/028; F02P 13/00
USPC ............... 123/143 R, 146.5 R, 169 R, 169 P, 123/169 PA, 273, 254, 41.32, 41.31
See application file for complete search history.

(56) References Cited

U.S. PATENT DOCUMENTS

| 1,107,946 A | * | 8/1914 | Hesselman | 123/193.5 |
| 2,716,970 A | | 9/1955 | Earl et al. | |
| 2,785,664 A | * | 3/1957 | Goldsmith | F02F 1/40 123/41.31 |
| 3,115,126 A | * | 12/1963 | Spencer | F02F 1/166 123/188.8 |
| 3,353,522 A | * | 11/1967 | Ley | F01P 3/16 123/41.31 |
| 4,083,333 A | * | 4/1978 | Rudert | F02F 1/242 123/41.82 R |
| 4,106,444 A | * | 8/1978 | Deutschmann | F02F 1/166 123/193.5 |
| 4,365,593 A | * | 12/1982 | Pomfret | F02F 1/36 123/41.32 |
| 4,475,995 A | * | 10/1984 | Ziegler | B23H 3/00 204/224 M |
| 4,625,682 A | * | 12/1986 | Dietrich | F01P 3/16 123/41.31 |
| 6,089,196 A | * | 7/2000 | Izuo | F01L 9/04 123/193.3 |

(Continued)

*Primary Examiner* — Marguerite J McMahon
*Assistant Examiner* — Teuta B Holbrook
(74) *Attorney, Agent, or Firm* — Jonathan F. Yates (57) ABSTRACT

A cylinder head assembly includes a cylinder head having an igniter mount that forms a portion of a fireside surface of the cylinder head. The assembly further includes a sleeve abutting the igniter mount within an igniter bore in the cylinder head, such that the sleeve and the cylinder head together form an igniter cooling passage circumferential of the igniter mount, and extending axially between the sleeve and the cylinder head. The configuration of the igniter mount and sleeve improves heat dissipation and reduces likelihood of pre-ignition in an internal combustion engine.

20 Claims, 4 Drawing Sheets

(56) References Cited

U.S. PATENT DOCUMENTS

| | | | |
|---|---|---|---|
| 9,382,887 B2 * | 7/2016 | Clark | F02B 77/00 |
| 2004/0139933 A1 * | 7/2004 | Obermayer | F01P 3/16 |
| | | | 123/41.82 R |
| 2010/0037844 A1 * | 2/2010 | Kinsey | F01L 1/182 |
| | | | 123/90.39 |
| 2010/0132638 A1 * | 6/2010 | Knollmayr | F02F 1/40 |
| | | | 123/41.72 |
| 2016/0363094 A1 * | 12/2016 | Luft | F02F 1/242 |

* cited by examiner

CYLINDER HEAD ASSEMBLY, CYLINDER HEAD, AND METHOD

TECHNICAL FIELD

The present disclosure relates generally to a cylinder head assembly in an internal combustion engine, and more particularly to a cylinder head having igniter mounting structure adapted for improved heat dissipation.

BACKGROUND

Internal combustion engines are well known and widely used for vehicle propulsion, production of rotational power in virtually innumerable machines, and electrical power generation. Burning of a combustible fuel and air within one or more cylinders in an internal combustion engine produces a rapid pressure rise to drive a piston that rotates a crankshaft according to well-known principles. Burning of the fuel and air produces heat and increases temperatures of engine components such that some form of active cooling is required in virtually all applications.

Most modern internal combustion engines include a cylinder block having the cylinders formed therein, and a cylinder head that includes intake and exhaust conduits, valves, and often fuel delivery devices. Depending upon the engine type, an igniter such as a sparkplug or a prechamber ignition device is also supported in the cylinder head. The internal geometry of the cylinder head can be relatively complex to accommodate multiple coolant passages for conveying a cooling fluid through the cylinder head to dissipate heat from combustion.

Cylinder head geometry, materials, component positioning, component type, and other properties have been varied in many different ways over the years in attempts to optimize cooling efficacy. Where internal combustion engines or components are not sufficiently cooled, various problems in the nature of cracking, thermal fatigue, seizure of moving parts, or even melting of materials can occur. Insufficient cooling efficacy can also limit the manner in which an engine can be operated. Since the capacity for heat rejection in an engine can relate to a quantity of fuel that can be burned in each combustion cycle, overall engine power output can be limited at least in a general sense by the engine's capacity to dissipate heat. The precision and control of ignition timing can also be impacted by cooling efficacy. Hot spots in engine components exposed to the heat of combustion can cause ignition to occur at a timing or in a manner that is different than what is intended. U.S. Pat. No. 2,716,970 to Earl et al. is directed to a Means for Directing Water in the Cylinder Head of an Internal Combustion Engine. Earl et al. proposed a design that provided a water distributor containing a specially-shaped orifice to direct coolant toward the deck surface of the cylinder sealing wall, apparently to increase turbulence in the flow of coolant over critical areas of the deck and ultimately limit lime deposits.

SUMMARY OF THE INVENTION

In one aspect, a cylinder head assembly for an internal combustion engine includes a cylinder head having an upper cylinder head surface, and a fireside surface opposite the upper cylinder head surface. The cylinder head has formed therein a plurality of gas exchange conduits connecting to a plurality of gas exchange openings located in the fireside surface. The cylinder head further includes an inner cylinder head surface forming an igniter bore that defines a center axis and extends between a first igniter bore end located adjacent to the upper cylinder head surface, and a second igniter bore end located adjacent to the fireside surface. The cylinder head further includes an igniter mount having a lower axial end that forms a portion of the fireside surface, and an upper axial end, and extending axially upward into the igniter bore. The cylinder head assembly further includes a sleeve positioned at least partially within the igniter bore, the sleeve including an inner sleeve surface abutting the upper axial end of the igniter mount at a radially inward location, and an outer sleeve surface abutting the inner cylinder head surface at a radially outward location. The sleeve and the cylinder head together form an igniter cooling passage that extends circumferentially around the igniter mount, and axially between the sleeve and the cylinder head, to direct a flow of a coolant about the igniter mount.

In another aspect, a cylinder head for an internal combustion engine includes a one-piece body including an upper cylinder head surface, and a fireside surface opposite the upper cylinder head surface. The one-piece body has formed therein a plurality of gas exchange conduits connecting to a plurality of gas exchange openings located in the fireside surface. The one-piece body further includes an inner cylinder head surface forming an igniter bore that defines a center axis and extends between a first igniter bore end located adjacent to the upper surface, and a second igniter bore end located adjacent to the fireside surface. The one-piece body further includes an igniter mount having a lower axial end that forms a portion of a fireside surface, and an upper axial end, and extending axially upward into the igniter bore. The igniter mount further includes an inner mount surface for mounting an igniter, and an outer mount surface structured to abut a sleeve positioned at least partially within the igniter bore. The outer mount surface extends circumferentially around the center axis and is spaced from the inner cylinder head surface. The one-piece body further has formed therein an annular groove extending circumferentially around the igniter mount and extending radially between the outer mount surface and the cylinder head inner surface, to form the floor of an igniter cooling passage for directing a flow of a coolant about the igniter mount.

In still another aspect, a method of making a cylinder head assembly for an internal combustion engine includes forming an igniter bore defining a center axis and extending between an upper cylinder head surface and a fireside surface in a one-piece body, such that an end of the igniter bore opens at the fireside surface. The method further includes machining the one-piece body within the igniter bore so as to form an igniter mount having a lower axial end that forms a portion of the fireside surface, and an upper axial end, and extending upwardly into the igniter bore. The method further includes positioning a sleeve within the igniter bore such that an inner sleeve surface abuts the upper axial end of the igniter mount at a radially inward location and an outer sleeve surface abuts an inner cylinder head surface at a radially outward location. The method still further includes forming an igniter cooling passage that extends circumferentially around the igniter mount and axially between the sleeve and the cylinder head by way of the positioning of the sleeve within the igniter bore.

DETAILED DESCRIPTION

Figure 1:
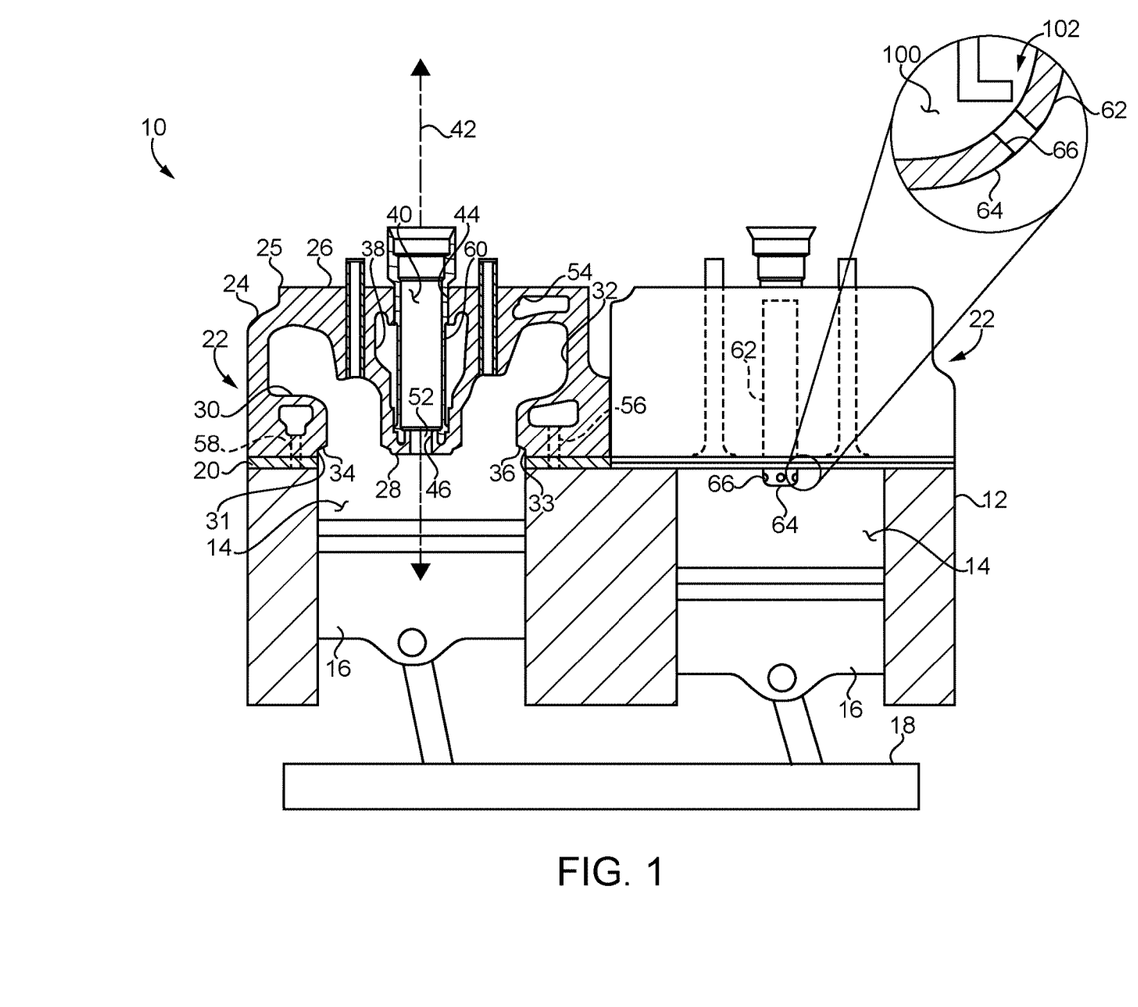
FIG. 1 is a partially sectioned side diagrammatic view of an internal combustion engine, according to one embodiment.

Referring to FIG. 1, there is shown an internal combustion engine 10 according to one embodiment, and including a cylinder block 12 having a plurality of cylinders 14 formed therein. A plurality of pistons 16 are positioned one within each one of cylinders 14 and coupled with a crankshaft 18 in a conventional manner. Internal combustion engine 10 (hereinafter "engine 10") could include any number of cylinders, arranged in any suitable configuration. Engine 10 further includes a cylinder head assembly 22 positioned upon and clamped to cylinder block 12, with a head gasket 20 positioned between cylinder head assembly 22 and cylinder block 12. In an implementation, cylinder head assembly 22 is one of a plurality of similar or identical cylinder head assemblies each associated with one of cylinders 14. Head gasket 20 could include a single head gasket structured for sealing about a plurality of cylinders, or a plurality of separate head gaskets each associated with one of cylinders 14. Descriptions herein of cylinder head assembly 22 or head gasket 20, or any other component, in the singular should be understood to refer analogously to other similar or identical features of engine 10. Cylinder head assembly 22 includes a cylinder head 24 which may be formed as a one-piece body 25 having an upper cylinder head surface 26, and a fireside surface 28 opposite upper cylinder head surface 24. One-piece body 25 includes a one-piece casting in a practical implementation strategy, although embodiments are contemplated wherein one-piece body 25 includes a forging or is formed from multiple pieces. The terms cylinder head 24 and one-piece body 25 are used herein interchangeably, and the use of one should be understood to refer to the other except where otherwise indicated or apparent from the circumstances. As further discussed herein, cylinder head assembly 22 is uniquely configured for heat dissipation and improved resistance to pre-ignition during operating engine 10.

Cylinder head 24 further has formed therein a plurality of gas exchange conduits 30 and 32 connecting to a plurality of gas exchange openings 34 and 36, respectively, located in fireside surface 28. Gas exchange conduit 30 could include an intake conduit and gas exchange conduit 32 could include an exhaust conduit, although the present disclosure is not thereby limited. An intake valve and an exhaust valve (not shown) may be positioned within cylinder head 24 and movable to alternately open and close gas exchange openings 34 or 36. Valve seat inserts (not shown) could be positioned within gas exchange openings 34 or 36 in some embodiments, as well as valve sleeves within cylinder head 24 to receive the intake and exhaust valves. It should be appreciated that no limitation is intended herein as to valve type, valve location, valve cooling, or valve operation. For example, in other embodiments multiple intake valves and/or multiple exhaust valves could be associated with each cylinder 14.

Cylinder head 24 further includes an inner cylinder head surface 38 that forms an igniter bore 40 that defines a center axis 42. The location of igniter bore 40 might be approximately in the center of cylinder 14, although the present disclosure is not thereby limited. Igniter bore 40 extends between a first igniter bore end 44 located adjacent to upper cylinder head surface 26, and a second igniter bore end 46 located adjacent to fireside surface 28. Inner cylinder head surface 38 may further define a coolant conduit 54 fluidly connected with a first coolant port 56 and a second coolant port 58. Either of port 56 and 58 could be an inlet or an outlet, or port 56 and port 58 could each be an inlet or each be an outlet. At least one of coolant port 56 or coolant port 58 may be structured to convey a flow of coolant between cylinder block 12 and cylinder head 24. It should also be appreciated that other engine coolant connections potentially between adjacent cylinder head assemblies 22, or with other parts of an engine coolant system could be employed in other embodiments, and the present disclosure is not intended to be limited to any particular coolant plumbing design or configuration. Multiple coolant conduits might also be provided within and through cylinder head 24 and each associated with a different coolant circuit. Accordingly, inner cylinder head surface 38 might include multiple inner cylinder head surfaces forming multiple coolant conduits within cylinder head 24.

Cylinder head 24 further includes an igniter mount 52 that is structured for mounting an igniter. An igniter 62 is shown mounted within the cylinder head assembly 22 upon the right in the illustration of FIG. 1. Igniter 62 will be understood to be positioned at least partially within the igniter bore (not numbered) of the corresponding cylinder head assembly, and positioned such that an igniter tip 64 is within the corresponding cylinder 14. Igniter mount 52 may be formed integrally in one-piece body or casting 25. A plurality of outlets 66 are formed in igniter tip 64 and structured to communicate between a chamber 100 within igniter 62 and cylinder 14. In an implementation, igniter 62 includes a spark ignition device wherein chamber 100 includes a spark chamber having a spark gap 102 therein. During operating engine 10 a spark can be produced at spark gap 102, and the spark communicated by way of outlet 66 to cylinder 14, or alternatively to ignite a mixture of fuel and air within chamber 100. Embodiments are contemplated where igniter 62 includes a prechamber ignition device that is supplied with a fuel, such that a mixture of the fuel and air is ignited by way of a spark produced at spark gap 102, and jets of combustion-initiating gases conveyed out of outlets 66 into the associated cylinder 14. In other implementations, igniter 62 includes a prechamber ignition device that is not separately supplied with a fuel but receives fuel for prechamber combustion from the associated cylinder. Igniter 62 could also include a spark plug having a spark gap positioned directly within the associated cylinder. Engine 10 might be equipped with a fuel delivery device such as a fuel injector positioned to extend into gas exchange conduit 30, or in other instances a fuel such as a gaseous fuel might be supplied into a flow of intake air at a location upstream of cylinder head assembly 22. It should be appreciated that no specific limitation as to the type of fuel or manner in which engine 10 is fueled is intended within the context of the present disclosure, and applications to both gaseous fuel engines, liquid fuel engines, direct-injected engines, port-injected engines and still others are contemplated.

Figure 2:
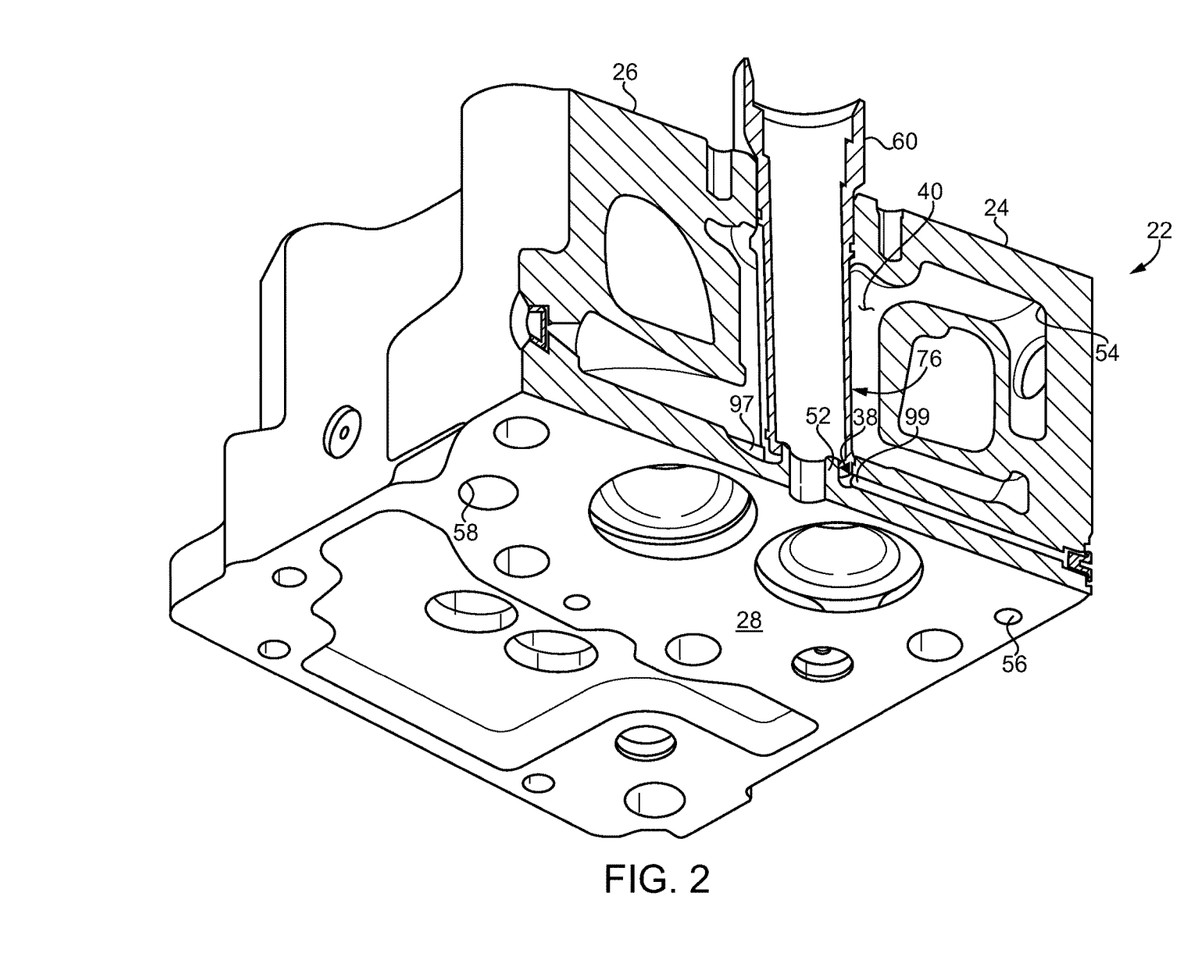
FIG. 2 is a sectioned view, in perspective, through a cylinder head assembly, according to one embodiment.
Figure 3:
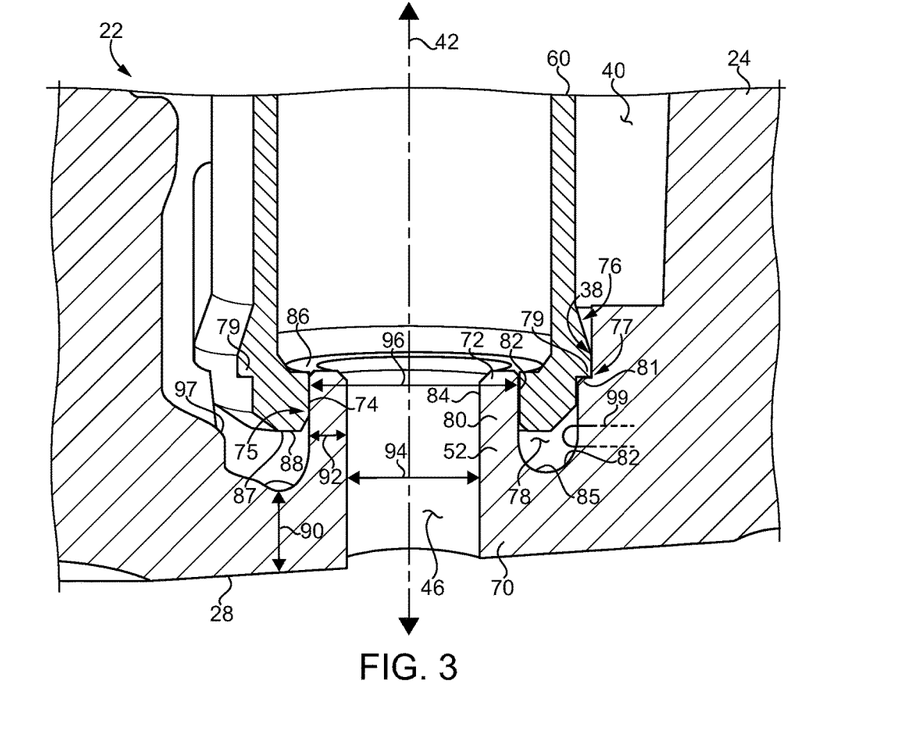
FIG. 3 is a sectioned view through a portion of the cylinder head assembly of FIG. 2.

Referring also now to FIGS. 2 and 3, igniter mount 52 may include a lower axial end 70 that forms a portion of fireside surface 28, and an upper axial end 72. Igniter mount 52 may extend axially upward into igniter bore 40 as can be seen from the illustrations. Cylinder head assembly 22 further includes a sleeve 60 positioned at least partially within igniter bore 40. Sleeve 60 includes an inner sleeve surface 74 abutting upper axial end 72 of igniter mount 52 to form a seal 75 that will typically be annular. Sleeve 60 further includes an outer sleeve surface 76 abutting inner cylinder head surface 38 at a radially outward location to form another seal 77 that is at least partially annular. As can be seen from FIG. 3, igniter mount 52 forms second igniter bore end 44. An igniter as in FIG. 1 can be mounted within second igniter bore end 46 such that the igniter extends axially upward into sleeve 60 and igniter bore 40. In an implementation, inner sleeve surface 74 faces a radially inward direction, and igniter mount 52 includes an outer mount surface 82 that faces a radially outward direction. Sleeve 60 has a shoulder 79 that abuts inner cylinder head surface 38. In the illustrated embodiment, inner cylinder head surface 38 forms another shoulder 81 that is abutted by shoulder 79 such that seal 77 includes an axial seal. Each of shoulder 79 and shoulder 81 can be annular or at least partially annular. Seal 75 can include a radial seal, formed by interference fitting sleeve 60 with igniter mount 52, however, the present disclosure is also not limited in this regard. Moreover, it should be appreciated that while seal 75 will typically be entirely circumferential of center axis 42, seal 77 may not be entirely circumferential of center axis 42, and instead may be discontinuous so as to form a coolant outlet 97 and/or potentially a coolant inlet. Coolant outlet 97 together with a coolant inlet 99 enables a flow of coolant to be directed through an igniter cooling passage 78 that extends circumferentially around igniter mount 52 and axially between sleeve 60 and cylinder head 24, the significance of which will be further apparent from the following description. Coolant outlet 97 and coolant inlet 99 may be fluidly connected with coolant conduit 54 by any suitable plumbing arrangement. In a practical implementation coolant outlet 97 may be arranged approximately 180 degrees from coolant inlet 99 about center axis 41, an arrangement that assists in obtaining uniform flow of coolant about igniter mount 52.

It can further be seen from FIG. 3 that igniter mount 52 includes an upwardly projecting stem wall 80, and that igniter cooling passage 78 extends circumferentially around upwardly projecting stem wall 80. An annular groove 82 extends circumferentially around igniter mount 52, radially between an outer mount surface 82 and inner cylinder head surface 38, to form a floor 85 of igniter cooling passage 78. Outer mount surface 82 is spaced from inner cylinder head surface 38. Further, upwardly projecting stem wall 80 includes a terminal axial end surface 86 that is exposed to an interior of sleeve 60 and positioned at a location that is axially upward from an axial end surface 87 of sleeve 60. Axial end surface 87 has an annular shape and extends circumferentially around igniter mount 52 such that axial end surface 87 forms a roof 88 of igniter cooling passage 78. In an implementation, each of outer mount surface 82 and inner mount surface 84 is located upon upwardly projecting stem wall 80. Stem wall 80 may have a material thickness or "radial thickness" 92 that is substantially uniform between inner mount surface 84 and outer mount surface 82. Radial thickness 92 extends from a first axial location adjacent to annular groove 82 to a second axial location adjacent to terminal axial end 86 of stem wall 80. In other embodiments, radial thickness 92 might be non-uniform.

As noted above, annular groove 82 is circumferential of igniter mount 52. It should be appreciated that the term groove as used herein is intended to encompass a structural surface feature that can be understood as recessed. A structure where a wall abuts a floor would not be understood to include a groove at the location of abutment, for example. In the illustrated embodiment, another material thickness or "axial thickness" 90 formed by a material of cylinder head 24 extends axially between floor 85 and fireside surface 28. Axial thickness 90 may be relatively thinner than in certain other known cylinder head designs and also thinner in an absolute sense, enabling more effective heat dissipation to a coolant circulated through coolant passage 78 in many instance. Radial thickness 92 is also relatively thin and enables heat dissipation at least primarily from an igniter within igniter mount 52. In an implementation, axial thickness 90 may be about 10 millimeters or less, and in a refinement may be about 8 millimeters. These dimensions could be scaled down for relatively smaller engines or scaled up for relatively larger engines. It can further be noted that radial thickness 92 is less than axial thickness 90, and in an embodiment axial thickness 90 might be about twice radial thickness 92. An inner diameter dimension 94 is defined by igniter mount 52, and an outer diameter dimension 96. Axial thickness 90 is less than each of inner diameter dimension 94 and outer diameter dimension 96. An axial length (not numbered) of igniter mount 52 that extends from fireside surface 28 to terminal axial end 86 may be greater than outer diameter dimension 96. In a further refinement, inner diameter dimension 94 may be about twice axial thickness 90, and outer diameter dimension 96 may be about three times axial thickness 90.

INDUSTRIAL APPLICABILITY

Figure 4:
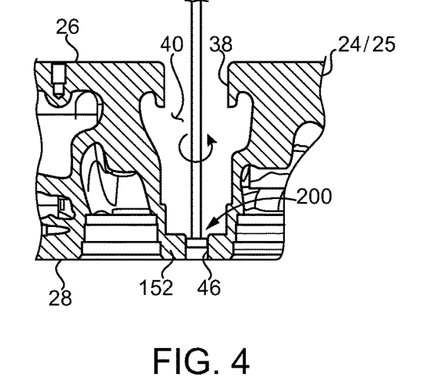
FIG. 4 is a sectioned view through a cylinder head at a processing stage, according to one embodiment.

Referring now to FIG. 4, there is shown cylinder head 24 as it might appear after casting and where a machining tool 200 is positioned within igniter bore 40 to form second igniter bore end 46. It should be appreciated that second igniter bore end 46 might be formed by casting, but could instead be machined originally following receiving cylinder head 24 from casting. In other words, igniter bore 40 in the casting might not extend all the way through between upper cylinder head surface 26 and fireside surface 28. At the stage shown in FIG. 4 material 152 surrounds second igniter bore end 46 and has not yet been fashioned to a shape optimal for serving as an igniter mount in the manner contemplated herein.

Figure 5:
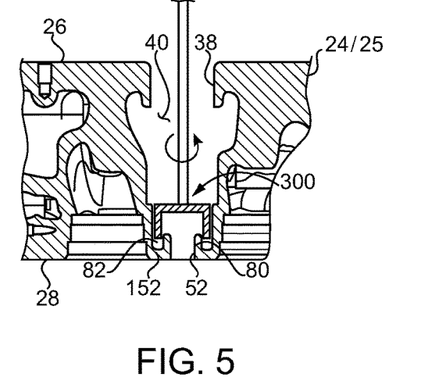
FIG. 5 is a sectioned view through the cylinder head at another processing stage.
Figure 6:
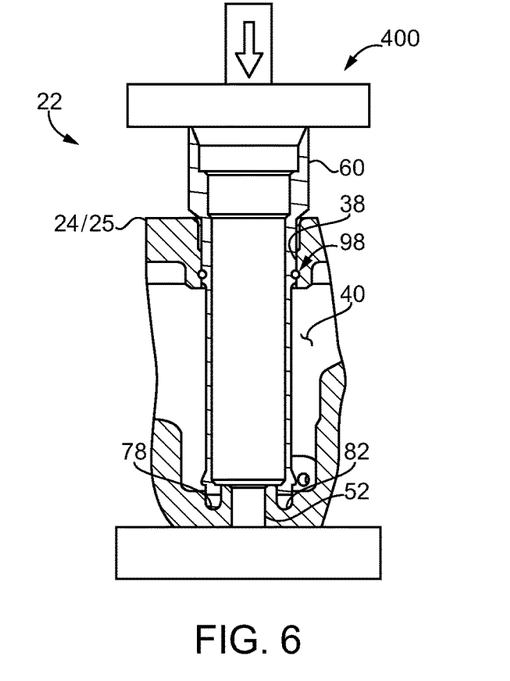
FIG. 6 is a sectioned side diagrammatic view through a portion of the cylinder head coupled with a sleeve to form a cylinder head assembly, according to one embodiment.

Referring also now to FIG. 5, there is shown one-piece body 25 as it might appear where another machining tool 300 is positioned within igniter bore 40 for machining to remove material 152 to form annular groove 82 and produce the geometry suitable for igniter mount 52. It will be understood that material 152 is generally removed in an axial direction by way of tool 300, reducing the thickness of material adjoining fireside surface. Referring now to FIG. 6, there is shown cylinder head 24 coupled with sleeve 60. Sleeve 60 has been interference fitted with cylinder head 24, such as by way of press fitting sleeve 60 into igniter bore 40 to fit sleeve 60 about and into engagement with igniter mount 52. A tool 400 such as a press is shown as it might appear applying linear force to sleeve 60 and cylinder head 24 to provide the desired press fitting force. It will be appreciated that the interference fitting of sleeve 60 and cylinder head 24 will form the desired seals as contemplated herein such that coolant passage 78 extends between cylinder head 24 and sleeve 60, and circumferentially about igniter mount 52. An O-ring seal 98 is also shown positioned about sleeve 60 and fluidly seals between sleeve 60 and cylinder head 24.

Figure 7:
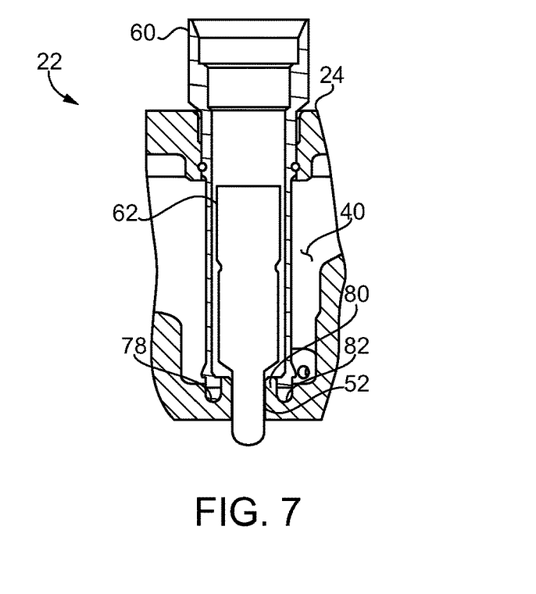
FIG. 7 is a partially sectioned side diagrammatic view similar to FIG. 6 showing an igniter installed in the cylinder head assembly.

As noted above, certain earlier designs for cylinder head assemblies provided insufficient heat rejection to reduce the risk of pre-ignition to optimally low levels. In the present disclosure, an igniter can be positioned within second igniter bore end 46 and in heat transference contact with material forming igniter mount 52. Referring to FIG. 7 there is shown cylinder head assembly 24 with an igniter 62 installed therein. During operating an engine incorporating cylinder head assembly 22, heat of combustion can be conducted into the igniter as well as into the fireside surface of the cylinder head. According to the present disclosure, outer mount surface 82 forms a wetted surface of igniter cooling passage 78, such that a direct heat conduction path extends between the igniter and coolant fluid, while at the same time a direct heat conduction path extends through the material that is located axially between passage 78 and fireside surface 28. The heat conduction patterns provided in this manner can assist in improved heat dissipation and thereby reduce the tendency for a hot igniter tip or hot spots in a fireside surface to cause ignition of fuel and air at a timing different than an intended timing that is based upon the production of a spark.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder head assembly for an internal combustion engine comprising:
    a cylinder head including an upper cylinder head surface, and a fireside surface opposite the upper cylinder head surface, and the cylinder head having formed therein a plurality of gas exchange conduits connecting to a plurality of gas exchange openings located in the fireside surface;
    the cylinder head further including an inner cylinder head surface forming an igniter bore that defines a center axis and extends between a first igniter bore end located adjacent to the upper cylinder head surface, and a second igniter bore end located adjacent to the fireside surface;
    the cylinder head further including an igniter mount and a groove extending circumferentially around the igniter mount, the igniter mount having a lower axial end that forms a portion of the fireside surface, and an upper axial end, and extending axially upward into the igniter bore;
    a sleeve positioned at least partially within the igniter bore, the sleeve including an inner sleeve surface abutting the upper axial end of the igniter mount at a radially inward location to form a first seal, and an outer sleeve surface abutting the inner cylinder head surface at a radially outward location to form a second seal; and
    the sleeve and the groove in the cylinder head together forming an igniter cooling passage that extends circumferentially around the igniter mount, and axially between the sleeve and the cylinder head, to direct a flow of a coolant that is confined within the groove between the first seal and the second seal about the igniter mount.

2. The assembly of claim 1 wherein the cylinder head includes a one-piece casting and the igniter mount is formed integrally in the one-piece casting.

3. The assembly of claim 2 wherein the igniter mount includes an upwardly projecting stem wall, and wherein the igniter cooling passage extends circumferentially around the upwardly projecting stem wall.

4. The assembly of claim 2 wherein the groove includes an annular groove and forms a floor of the igniter cooling passage.

5. The assembly of claim 4 wherein the sleeve includes an axial end surface forming a roof of the igniter cooling passage.

6. The assembly of claim 4 wherein the igniter mount forms the second igniter bore end, and further comprising an igniter mounted within the igniter mount.

7. The assembly of claim 5 wherein the igniter includes a spark ignition device.

8. The assembly of claim 4 wherein the igniter mount includes an outer mount surface extending circumferentially around the center axis, and the inner sleeve surface abuts the outer mount surface to form the first seal, and the first seal is annular.

9. The assembly of claim 8 wherein the inner sleeve surface faces a radially inward direction and the outer mount surface faces a radially outward direction, and the sleeve has an annular shoulder that abuts the inner cylinder head surface.

10. A cylinder head for an internal combustion engine comprising:
    a one-piece body including an upper cylinder head surface, and a fireside surface opposite the upper cylinder head surface, and the one-piece body having formed therein a plurality of gas exchange conduits connecting to a plurality of gas exchange openings located in the fireside surface;
    the one-piece body further including an inner cylinder head surface forming an igniter bore that defines a center axis and extends between a first igniter bore end located adjacent to the upper surface, and a second igniter bore end located adjacent to the fireside surface;
    the one-piece body further including an igniter mount having a lower axial end that forms a portion of the fireside surface, and an upper axial end, and extending axially upward into the igniter bore;
    the igniter mount further including an inner mount surface for mounting an igniter, and an outer mount surface structured to abut a sleeve positioned at least partially within the igniter bore;
    the outer mount surface extending circumferentially around the center axis and spaced from the inner cylinder head surface, and the one-piece body further having formed therein an annular groove extending circumferentially around the igniter mount and extending radially between the outer mount surface and the cylinder head inner surface, to form the floor of an igniter cooling passage for directing a flow of a coolant about the igniter mount;

a coolant conduit is defined by the one-piece body and opens to the igniter cooling passage within the annular groove.

11. The cylinder head of claim 10 wherein the igniter mount includes an upwardly projecting stem wall, and each of the outer mount surface and the inner mount surface are located upon the upwardly projecting stem wall.

12. The cylinder head of claim 11 wherein a first material thickness of the one-piece body extends axially between the fireside surface and the annular groove, and a second material thickness extends radially between the inner mount surface and the outer mount surface, and wherein the first material thickness is greater than the second material thickness.

13. The cylinder head of claim 12 wherein the first material thickness is about 10 millimeters or less.

14. The cylinder head of claim 12 wherein the igniter mount defines an inner diameter dimension and an outer diameter dimension, and wherein the inner diameter dimension is about twice the first material thickness and the outer diameter dimension is about three times the first material thickness.

15. The cylinder head of claim 11 wherein the second material thickness is substantially uniform from a first axial location adjacent to the annular groove to a second axial location adjacent to a terminal axial end surface of the stem wall.

16. A method of making a cylinder head assembly for an internal combustion engine comprising:

forming an igniter bore defining a center axis and extending between an upper cylinder head surface and a fireside surface in a one-piece body, such that an end of the igniter bore opens at the fireside surface;

machining the one-piece body within the igniter bore so as to form an igniter mount having a lower axial end that forms a portion of the fireside surface, and an upper axial end, and extending upwardly into the igniter bore;

positioning a sleeve within the igniter bore such that an inner sleeve surface abuts the upper axial end of the igniter mount at a radially inward location and an outer sleeve surface abuts an inner cylinder head surface at a radially outward location; and forming an igniter cooling passage that extends circumferentially around the igniter mount and axially between the sleeve and the fireside surface by way of the positioning of the sleeve within the igniter bore; and forming a coolant conduit defined by the one-piece body that opens to the igniter cooling passage at a location that is axially between the sleeve and the fireside surface.

17. The method of claim 16 wherein the machining of the one-piece body further includes removing material from the one-piece body so as to form an upwardly extending stem wall extending circumferentially around the center axis, and an annular groove extending circumferentially around a base of the stem wall and forming a floor of the igniter cooling passage.

18. The method of claim 17 wherein the machining of the one-piece body further includes reducing an axial thickness of a material forming the one-piece body between the igniter bore and the fireside surface.

19. The method of claim 18 wherein the positioning of the sleeve within the igniter bore further includes positioning the sleeve such that the sleeve forms an annular seal with the igniter mount and an axial end surface of the sleeve forms a roof of the igniter cooling passage.

20. The method of claim 17 further comprising positioning an igniter within the end of the igniter bore such that an inner surface of the igniter mount is in contact with the igniter, and an outer surface of the igniter mount forms a wetted surface of the igniter cooling passage.

\* \* \* \* \*